Patented June 10, 1947

2,421,770

UNITED STATES PATENT OFFICE 2,421,770

ACETAL COMPOUNDS

Joseph E. Bludworth and Donald P. Easter, Cumberland, Md., assignors to Celanese Corporation of America, a corporation of Delaware No Drawing. Application September 19, 1944, Serial No. 554,859

4 Claims. (Cl. 260—338)

This invention relates to the preparation of organic compounds and relates more particularly to the production of novel acetals.

An object of this invention is the preparation of valuable acetals of $\Delta^3$-tetrahydrobenzaldehyde and derivatives thereof.

Another object of this invention is the production of novel organic compounds which are valuable for use as plasticizers, solvents, aromatics and as intermediates in the synthesis of other organic compounds.

Other objects of this invention will appear from the following detailed description.

The reaction between unsaturated organic compounds in accordance with the Diels-Alder condensation yields valuable cyclic compounds. Thus, for example, by reacting butadiene with acrolein there is obtained $\Delta^3$-tetrahydrobenzaldehyde.

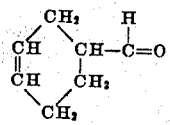

We have now discovered that by reacting $\Delta^3$-tetrahydrobenzaldehyde with ethylene oxide valuable cyclic acetals are produced which, by suitable procedures, may be converted into other equally valuable derivatives. The novel compounds of our invention have the following general formula:

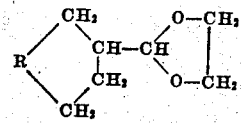

wherein R is a divalent group such as $$-CH=CH-, \quad -CH_2-CH_2-$$

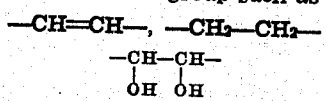

or substituted

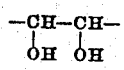

groups, such as, for example, the group

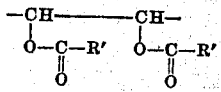

wherein R' is an alkyl, cycloalkyl, aryl or aralkyl group, and the group

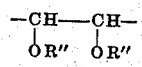

wherein R'' is an alkyl, cycloalkyl, aryl or aralkyl group. In the case of our novel ethers or esters, R' and R'' may be alkyl radicals such as, for example, methyl, ethyl, propyl, isopropyl, butyl, amyl, lauryl, vinyl or alkyl groups, or halogen or hydroxy substituted alkyl groups, cycloalkyl radicals, such as cyclohexyl or cyclohexenyl, aryl radicals, such as phenyl or naphthyl, or nuclear alkyl substituted derivatives thereof, such as tolyl, or cumyl, as well as halogen and like nuclear substituted derivatives of said aryl radicals, or aralkyl radicals such as benzyl.

In reacting $\Delta^3$-tetrahydrobenzaldehyde with ethylene oxide, the reaction is preferably effected at a temperature of from 40 to 50° C. in an inert solvent with the aid of a catalyst, such as, for example, anhydrous stannic chloride or lead tetrachloride. Suitable inert solvents which may be employed are benzene or diethyl ether. The reaction is usually effected by dissolving about 200 parts by weight of $\Delta^3$-tetrahydrobenzaldehyde in the inert solvent, adding from 15 to 40 parts of the catalyst on the weight of the $\Delta^3$-tetrahydrobenzaldehyde and then adding from 100 to 150 parts by weight of ethylene oxide gradually to the mixture with agitation while maintaining the temperature of the reactants at from 40 to 50° C. The addition of the ethylene oxide is completed in 2 to 4 hours, and the total reaction time is usually from 3 to 5 hours. The mixture obtained after reaction is complete is treated with aqueous sodium hydroxide to remove stannic chloride as sodium stannate and sodium chloride and then washed with water to remove excess sodium hydroxide remaining. The inert solvent is removed by evaporation and the residue remaining extracted with 95% ethyl alcohol. The alcohol carrying the extracted material in solution is evaporated, leaving the desired acetal, $\Delta^3$-tetrahydrobenzaldehyde ethylene acetal, which is then purified by distillation under reduced pressure. This acetal, which has the following formula,

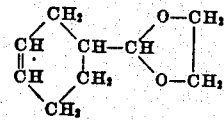

may be reduced to the corresponding hexahydrobenzaldehyde ethylene acetal

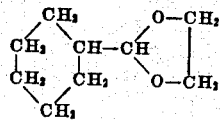

or oxidized by a suitable procedure to 3,4-dihydroxy-hexahydrobenzaldehyde ethylene acetal

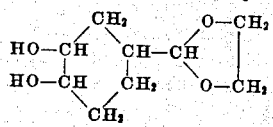

This polyhydroxy cyclic acetal may then be esterified, employing suitable esterifying agents such as acid anhydrides or acid chlorides, or it may be etherified employing etherifying agents such as, for example, diethyl or dimethyl sulfate or by other etherifying procedures.

Our novel compounds form a group of useful plasticizers for thermoplastic materials, particularly cellulose acetate or other organic derivatives of cellulose, as well as useful intermediates in the preparation of higher molecular weight compounds.

In order further to illustrate our invention but without being limited thereto, the following examples are given:

*Example I*

200 parts by weight of Δ³-tetrahydrobenzaldehyde are dissolved in 440 parts by weight of benzene and 22 parts by weight of anhydrous stannic chloride are added thereto. After the initial exothermic reaction has subsided, 100 parts by weight of ethylene oxide are added slowly with stirring over a period of three hours, the temperature of reaction being held at about 40° C. during the ethylene oxide addition. Reaction proceeds smoothly and is completed in about 3 hours after the initial addition of ethylene oxide. The benzene solution obtained is washed with about 100 parts by weight of 10% aqueous sodium hydroxide solution and then washed three times employing about 100 parts by weight of water for each washing. The benzene is evaporated from the resulting solution and the residue is taken up in alcohol. Insoluble materials are filtered off and the alcohol evaporated. The yellow oil remaining comprises Δ³-tetrahydrobenzaldehyde ethylene acetal and boils at 98–104° C. at 7 mm. pressure. This compound has a refractive index of 1.4768 at 20° C. and a specific gravity of 1.0418 at 20°/20°.

*Example II*

Δ³-tetrahydrobenzaldehyde ethylene acetal may be reduced as follows. 35 parts by weight of Δ³-tetrahydrobenzaldehyde ethylene acetal are dissolved in 400 parts by weight of ethyl alcohol and 50 parts by weight of Raney nickel added thereto. The reduction is carried out at 50° C. for eight hours under 1400 lbs. per sq. inch hydrogen pressure. Evaporation of the alcohol followed by vacuum distillation yields a distillate comprising purified hexahydrobenzaldehyde ethylene acetal. This acetal boils at 87–91° C. at 10 mm. pressure and has a refractive index of 1.4569 at 20° C. and a specific gravity of 0.9976 at 20°/20°. This novel acetal is quite compatible with cellulose acetate and yields well plasticized films of excellent breaking strength and elongation.

*Example III*

A suspension of 30 parts by weight of Δ³-tetrahydrobenzaldehyde ethylene acetal in 200 parts water is stirred and cooled at 5° C. A solution of 63 parts potassium permanganate in 1000 parts water is added over a period of 1½ hours, keeping temperature below 5° C. at all times. The mixture is then heated on a steam bath for one hour. The precipitated manganese dioxide is removed by filtration and the filtrate saturated with sodium sulfate and ether-extracted. The ether extract is dried over anhydrous sodium sulfate and evaporated. The residue comprises 3,4-dihydroxy-hexahydrobenzaldehyde ethylene acetal.

*Example IV*

To a solution of 188 parts by weight of 3,4-dihydroxy-hexahydrobenzaldehyde ethylene acetal in 350 parts absolute diethyl ether is added in small pieces 46 parts of metallic sodium at such a rate as to keep the ether slowly refluxing. When the addition of sodium is complete, 126 parts of dimethyl sulfate is added with stirring, keeping the ether gently boiling. Cooling may be applied if the reaction tends to become violent during the initial stages of the addition. After the dimethyl sulfate has been added, the mixture is stirred and refluxed for one hour. The sodium sulfate is removed by filtration and the ether evaporated from the filtrate. The residue comprises 3,4 - dimethoxy - hexahydrobenzaldehyde ethylene acetal.

*Example V*

A mixture of 188 parts by weight of 3,4-dihydroxy-hexahydrobenzaldehyde ethylene acetal with 204 parts acetic anhydride is boiled under reflux for one hour. After cooling, the mixture is neutralized with 10% sodium bicarbonate solution and extracted with ether. The ethereal extract is dried over anhydrous sodium sulfate and evaporated. The residue comprises 3,4-diacetoxy-hexahydrobenzaldehyde ethylene acetal.

It is to be understood that the foregoing detailed description is given merely by way of illustration and that many variations may be made therein without departing from the spirit of our invention.

Having described our invention, what we desire to secure by Letters Patent is:

1. Acetals of the following general formula:

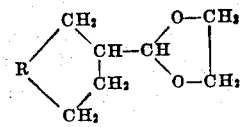

wherein R is a divalent radical selected from the group consisting of —CH=CH—, —CH₂—CH₂—,

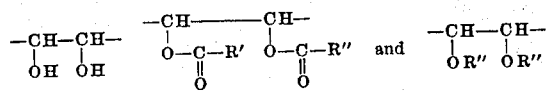

wherein R' and R" are selected from the group consisting of alkyl, cycloalkyl, aryl and aralkyl groups.

2. Δ³-tetrahydrobenzaldehyde ethylene acetal.
3. 3,4-diacetoxy-hexahydrobenzaldehyde ethylene acetal.
4. 3,4-dimethoxy-hexahydrobenzaldehyde ethylene acetal.

JOSEPH E. BLUDWORTH.
DONALD P. EASTER.

REFERENCES CITED

The following references are of record in the file of this patent:

UNITED STATES PATENTS

| Number | Name | Date |
| --- | --- | --- |
| 2,331,614 | Marple et al. | Oct. 12, 1943 |

OTHER REFERENCES

Bogert et al., J. Am. Chem. Soc., 55, 3741–3745, (1933).

Certificate of Correction

Patent No. 2,421,770.  June 10, 1947.

JOSEPH E. BLUDWORTH ET AL.

It is hereby certified that errors appear in the printed specification of the above numbered patent requiring correction as follows: Column 3, line 62, for the word "at" read *to*; column 4, line 48, claim 1, for that portion of the formula reading "O—C—R''''" read *O—C—R'*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.*